(12) United States Patent
Nagafuji et al.

(10) Patent No.: US 8,358,887 B2
(45) Date of Patent: *Jan. 22, 2013

(54) OPTICAL WAVEGUIDE WITH LIGHT EMITTING DEVICE AND OPTICAL TOUCH PANEL

(75) Inventors: Akiko Nagafuji, Ibaraki (JP); Yusuke Shimizu, Ibaraki (JP)

(73) Assignee: Nitto Denko Corporation, Ibaraki-shi, Osaka (JP)

( * ) Notice: Subject to any disclaimer, the term of this patent is extended or adjusted under 35 U.S.C. 154(b) by 203 days.

This patent is subject to a terminal disclaimer.

(21) Appl. No.: 12/637,209

(22) Filed: Dec. 14, 2009

(65) Prior Publication Data

US 2010/0188367 A1 Jul. 29, 2010

Related U.S. Application Data

(60) Provisional application No. 61/152,391, filed on Feb. 13, 2009.

(30) Foreign Application Priority Data

Jan. 23, 2009 (JP) .................................. 2009-013044

(51) Int. Cl.
*G02B 6/26* (2006.01)
*G02B 6/42* (2006.01)

(52) U.S. Cl. ............. 385/32; 385/43; 345/175; 345/176

(58) Field of Classification Search .............. 385/32, 385/39, 43–48; 345/173, 175, 176
See application file for complete search history.

(56) References Cited

U.S. PATENT DOCUMENTS

| 3,564,233 | A | * | 2/1971 | Cox et al. ................... 40/444 |
| 4,846,540 | A | * | 7/1989 | Kapon ....................... 385/45 |
| 6,878,925 | B2 | * | 4/2005 | Yamada et al. ........ 250/227.11 |
| 7,509,011 | B2 | * | 3/2009 | Payne ....................... 385/129 |
| 8,150,220 | B2 | * | 4/2012 | Nagafuji et al. ............ 385/32 |
| 2004/0120672 | A1 | * | 6/2004 | Chong et al. .............. 385/129 |
| 2006/0002655 | A1 | * | 1/2006 | Smits ........................ 385/31 |
| 2006/0188198 | A1 | | 8/2006 | Charters et al. |

FOREIGN PATENT DOCUMENTS

| DE | 102006041085 A1 * | 5/2007 |
| JP | 2007-070320 A | 3/2007 |
| WO | WO 2005080861 A1 * | 9/2005 |

* cited by examiner

*Primary Examiner* — Daniel Petkovsek
(74) *Attorney, Agent, or Firm* — Westerman, Hattori, Daniels & Adrian, LLP

(57) ABSTRACT

In an optical waveguide 10 with a light emitting device to be used in the present invention, branched points 16 are sequentially provided in a guiding light direction 17 of a main path 14 and the width of the main path 14 becomes narrower as the main path 14 moves away from a light emitting device 11. The optical waveguide 10 having this structure can reduce a width W1 because there are no portions that correspond spaces (cladding layers) among adjacent branched paths 15. Moreover, the optical waveguide 10 has an excellent optical transmission efficiency, resulting in high intensity of light emitted. Uniformity of the light emitted is equal or more than a conventional optical waveguide 60 with a light emitting device.

5 Claims, 6 Drawing Sheets

PRIOR ART

OPTICAL WAVEGUIDE WITH LIGHT EMITTING DEVICE AND OPTICAL TOUCH PANEL

BACKGROUND OF THE INVENTION

1. Field of the Invention

The present invention relates to an optical waveguide with a light emitting device and an optical touch panel using the same.

2. Description of the Related Art

Conventionally, optical waveguides with branched structure for generating a plurality of light beams from one light emitting device are known (For example, US 2006/0188198 A1). Such optical waveguides are preferably used for emitting light beams to a coordinate input region of an optical touch panel. However, a conventional optical waveguide with a light emitting device suffered from its wide width and its low intensity of light beams emitted.

FIG. 6 shows one example of a conventional optical waveguide 60 with a light emitting device. As shown in FIG. 6, in the conventional optical waveguide 60 with a light emitting device, a plurality of branch points 62 are provided on a straight line perpendicular to a light guiding direction 64 of a main path 63 to uniformly distribute light emitted from a light emitting device 61. The optical waveguide 60 with a light emitting device had a wide width W3 because there were spaces (cladding layers) 66 among branched paths 65. Further, the optical waveguide 60 with a light emitting device was poor in optical transmission efficiency and the intensity of light emitted was low.

Conventional optical waveguides with light emitting devices had a disadvantage of having a wide width and a low intensity of light beams to be emitted. It is an object of the present invention to provide an optical waveguide with a light emitting device having a high intensity of light beams to be emitted.

SUMMARY OF THE INVENTION

The gist of the present invention is as below.

In a first preferred embodiment, an optical waveguide with a light emitting device according to the present invention comprises: a light emitting device; and an optical waveguide including a core for guiding light emitted from the light emitting device to generate light beams, wherein the core comprises: a main path; and a plurality of branched paths branched at branched points from the main path, the branched points are sequentially provided in a guiding light direction, and the width of the main path becomes narrower as the main path moves away from the light emitting device.

In a second preferred embodiment of the optical waveguide with a light emitting device according to the present invention, a core is embedded in a cladding layer and the core has a refractive index higher than the cladding layer.

In a third preferred embodiment of the optical waveguide with a light emitting device according to the present, the maximum refractive index difference between the core and the cladding layer is 0.02 to 0.2.

In a fourth preferred embodiment of the optical waveguide with a light emitting device according to the present invention, the cladding layer comprises: an under-cladding layer; and an over-cladding layer, wherein the core is formed on the under-cladding layer and embedded by the over-cladding layer.

In a fifth preferred embodiment of the optical waveguide with a light emitting device according to the present invention, the cladding layer has a convex lens formed into virtually a ¼ arc shape in the cross section at a tip section where light beams are emitted.

In a sixth preferred embodiment, an optical touch panel according to the present invention comprises: a coordinate input region; an optical waveguide with a light emitting device for generating light beams crossing the coordinate input region; a light-receiving sided-optical waveguide for receiving the light beams having crossed the coordinate input region; and light emitting device groups for detecting the intensity of light received at the light-receiving sided-optical waveguide, wherein the optical waveguide with a light emitting device is the aforementioned optical waveguide with a light emitting device.

ADVANTAGE OF THE INVENTION

According to the present invention, it is possible to make a maximum width W1 (FIG. 1) of the cores (main paths) of the optical waveguide with a light emitting device narrower than a width W3 of the main path 63 of the conventional optical waveguide 60 with a light emitting device by 50% or more and make the intensity of light emitted approximately 10 times as high as the conventional optical waveguide 60 with a light emitting device.

For a full understanding of the present invention, reference should now be made to the following detailed description of the preferred embodiments of the invention as illustrated in the accompanying drawings.

DESCRIPTION OF THE PREFERRED EMBODIMENTS

Figure 1:
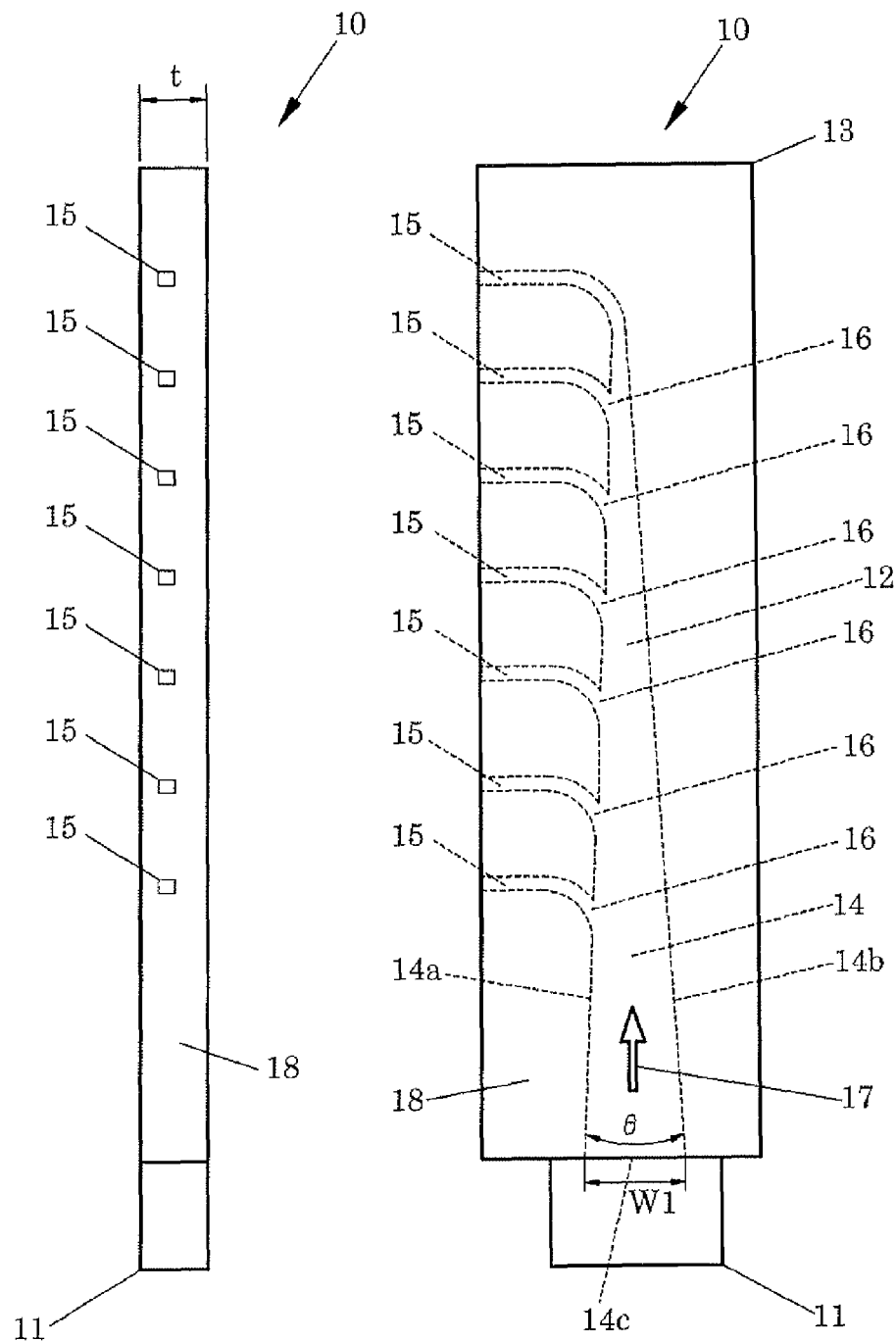
FIG. 1 is one example of a schematic view of an optical waveguide with a light emitting device of the present invention.

The preferred embodiments of the present invention will now be described with reference to FIGS. 1-6 of the drawings. Identical elements in the various figures are designated with the same reference numerals.

[Optical Waveguide with Light Emitting Device of the Present Invention]

FIG. 1 shows one example of an optical waveguide 10 with a light emitting device. As shown in FIG. 1, the optical waveguide 10 with a light emitting device comprises: a light emitting device 11; an optical waveguide 13 including a core 12 for guiding light emitted from the light emitting device 11 to generate a plurality of light beams. The core 12 comprises: a main path 14; and a plurality of branched paths 15 branched from the main path 14, wherein light beams are emitted from an end of the branched paths 15. Branched points 16 on which respective branched paths 15 branched from the main path 14 are sequentially provided in a guiding light direction 17 of the main path 14 and the main path 14 becomes narrower as the main path 14 moves away from the light emitting device 11. The shape of the main path 14 is designed such that an angle θ formed by one side 14a extending in a light guiding direction 17 and the other side 14b opposed to the one side 14a may be preferably 0.1° to 5°.

As shown in FIG. 1, in the optical waveguide 10 with a light emitting device to be used in the present invention, the branched points 16 are sequentially provided in the light guiding direction 17 of the main path 14 and the main path 14 becomes narrower as the main path 14 moves away from the light emitting device 11. The optical waveguide 10 with a light emitting device having this structure can reduce a width W1 of the main path 14 by 50% or higher because there are no portions that correspond spaces 66 (cladding layers) of a conventional optical waveguide 60 with a light emitting device among the branched paths 15 adjacent to each other. Further, the optical waveguide 10 with a light emitting device has an excellent optical transmission efficiency because the branched paths 15 are short, resulting in high intensity of light to be emitted. Uniformity of the light emitted is equal to or more than the conventional optical waveguide 60 with a light emitting device.

Figure 2:
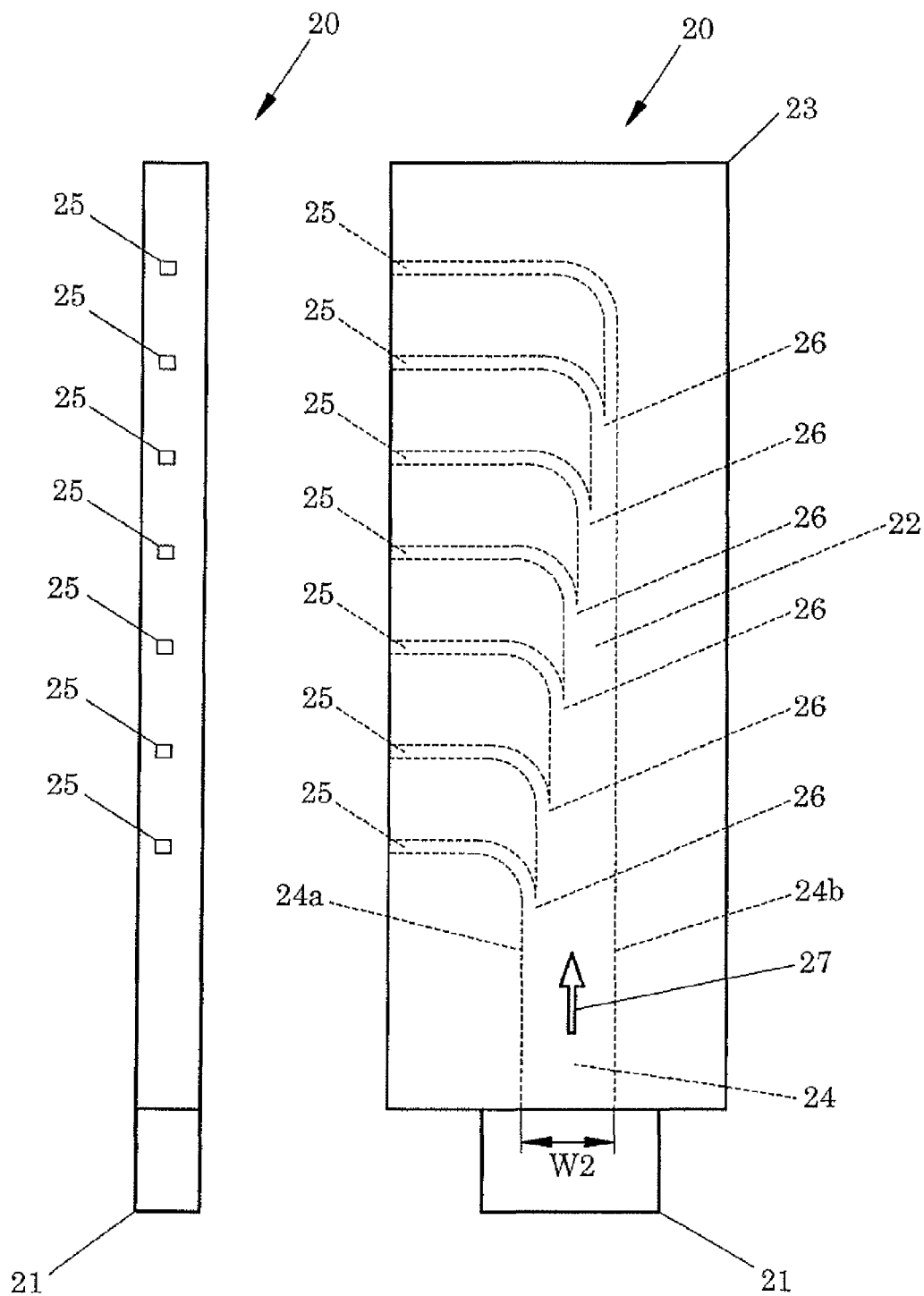
FIG. 2 is another example of a schematic view of an optical waveguide with a light emitting device of the present invention.

FIG. 2 shows another example of an optical waveguide 20 with a light emitting device. The optical waveguide 20 with a light emitting device of another example in the present invention comprises: a light emitting device 21; an optical waveguide 23 including a core 22 for guiding light emitted from the light emitting device 21 to generate a plurality of light beams. The core 22 comprises: a main path 24; and a plurality of branched paths 25 branched from the main path 24. And light beams are emitted from an end of respective branched paths 25. A plurality of branched points 26 where each of the branched paths 25 is branched from the main path 24 are sequentially provided in a light guiding direction 27 of the main path 24. The width of the main path 24 becomes narrower as the main path 24 moves away from the light emitting device 21.

The optical waveguide 20 with a light emitting device is different from the aforementioned optical waveguide 10 with a light emitting device in that one side 24a extending in the light guiding direction 27 of the main path 24 is parallel to the other side 24b oppositely faced to the one side 24a. This shape enables a width W2 of the main path 24 to be reduced.

[Optical Touch Panel]

Figure 3:
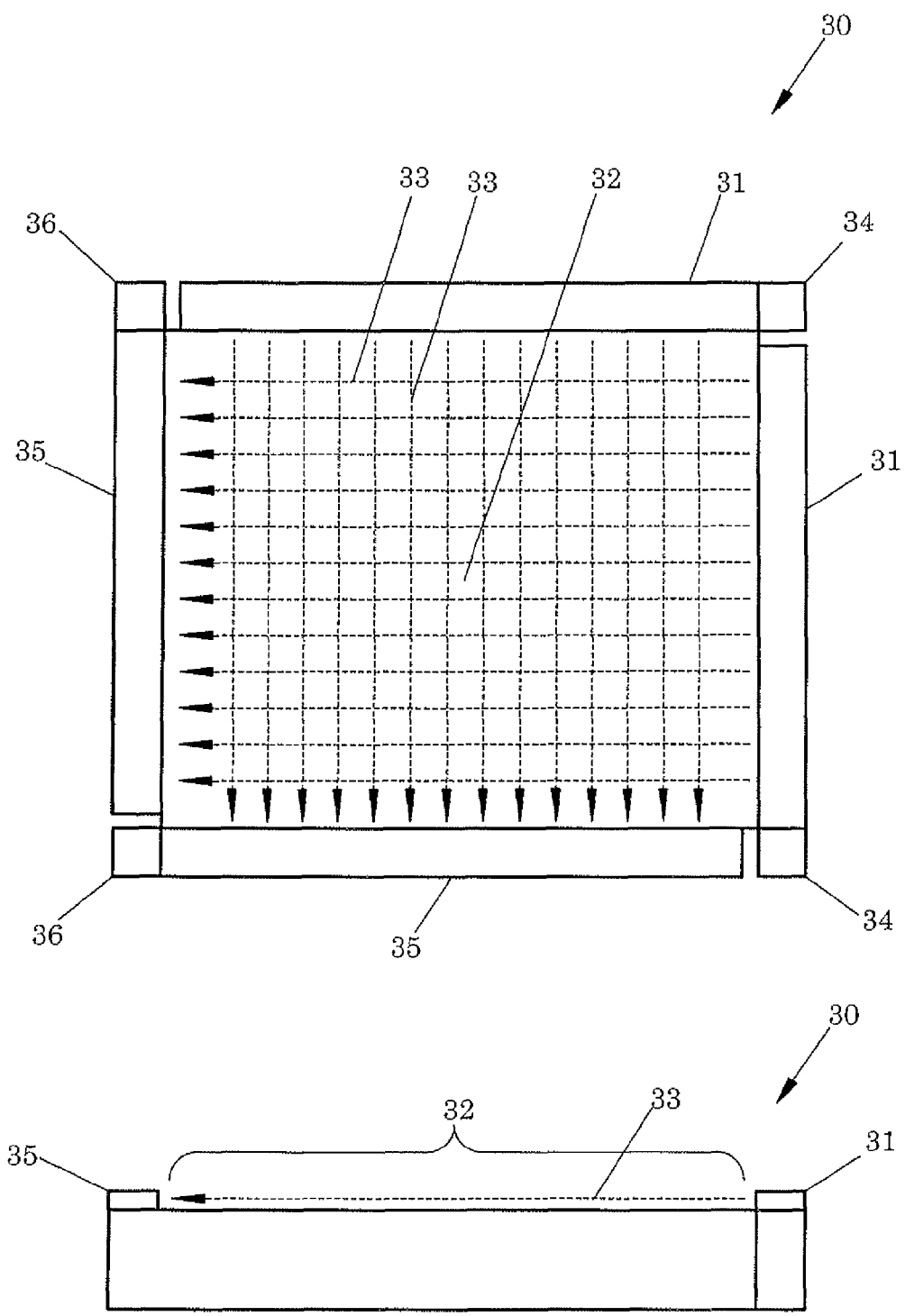
FIG. 3 is a schematic view of an optical touch panel.

As shown in FIG. 3, in a preferred embodiment, optical waveguides with light emitting devices of the present invention are used as a light-emitting sided-optical waveguide 31 and a light emitting device 34 of an optical touch panel 30. The optical touch panel 30 comprises: a coordinate input region 32; a light emitting device 34 for generating light beams 33 longitudinally and laterally crossing the coordinate input region 32 and having an output end; a light-emitting sided-optical waveguide 31; a light-receiving sided-optical waveguide 35 for receiving the light beams 33 having crossed the coordinate input region 32 and having an input end; and a plurality of light receiving device groups 36 for detecting the intensity of the light beams 33 received at the light-receiving sided-optical waveguide 35. The light receiving device groups 36 are aggregates of the plurality of light receiving devices.

In such an optical touch panel 30, the intensity of light incident on the light receiving device groups 36 is reduced when part of the light beams 33 crossing the coordinate input region 32 is blocked by a finger or a pen. By detecting such a reduction, it is possible to recognize the coordinate position of the finger or the pen.

When the conventional optical waveguide 60 with a light emitting device is used as the light-emitting sided-optical waveguide 31 and the light emitting device 34, a width W3 of a main path 63 of respective cores is obtained by summing the width of approximately 40 pieces of branched paths 65 and the spaces 66 among each of the branched paths 65, for example, to obtain a resolution of 3 mm or so in the optical touch panel 30 having a diagonal size of 10.4 inches.

On the other hand, the width W1 of the main path 14 in the core 12 is the width obtained by summing approximately 40 pieces of branched paths 15 at the widest position when using the optical waveguide 10 with a light emitting device. This makes it possible to reduce the width W1 by about 50% compared to the conventional optical waveguide 60 with a light emitting device.

[Light Emitting Device]

Any light emitting device may be used as the light-emitting device 34 to be used in the present invention, as long as the light emitting device 34 generates the light beams 33 to cross the coordinate input region 32 through the optical waveguide 31.

The light emitting device 34 is preferably a light-emitting diode or a semiconductor laser, more preferably a VCSEL (Vertical Cavity Surface Emitting Laser). A VCSEL is excellent in optical transmission efficiency because light in a VCSEL is resonated in a direction perpendicular to a substrate surface and can emit light in the surface and in a perpendicular direction.

The wavelength of light emitted from the light emitting device 34 is preferably within the near-infrared region (700 nm to 2500 nm).

[Optical Waveguide with a Light Emitting Device]

As shown in FIG. 1, the optical waveguide 13 to be used for the optical waveguide 10 with a light emitting device comprises the core 12 for guiding light emitted from the light emitting device 11 to generate a plurality of light beams. The core 12 comprises: the main path 14; and a plurality of branched paths 15 branched from the main path 14. The branched points 16 on which respective branched paths 15 are branched from the main path 14 are sequentially provided in the light guiding direction 17 of the main path 14. The main path 14 is formed so that its width may become narrower as the main path 14 moves away from the light emitting device 11.

Generally, an end 14c of the main path 14-side on the core 12 is optically coupled (optical coupling) to the light emitting device 11. A method for optical coupling is not particularly limited, but examples of the method include a method for adjusting so that the center position of light intensity distribution of the light emitting device 11 may be coincident with the center of the core 12 or a method for using an optical path conversion mirror. For example, the optical path conversion mirror is a V-shaped groove formed by a dicing process.

The maximum width W1 of the main path 14 of the core 12 is determined according to the size and the resolution of the optical touch panel 30, but is typically 500 to 5,000 μm. The width W1 of the main path 14 becomes narrower as the main path 14 moves away from the light emitting device 11. The shape of the main path 14 is such designed that the angle θ formed by the one side 14a extending in the light guiding direction 17 of the main path 14 and the other side 14b oppositely faced to the one side 14a may be 0.1° to 5°.

The number of the branched paths 15 branched from the main path 14 is determined according to the size and the resolution of the optical touch panel 30, but is preferably 30 to 500, more preferably 50 to 2,000. Spaces among the adjacent branched points 16 provided in the light guiding direction 17 of the main path 14 are preferably 100 to 2,000 µm. The maximum width of the respective branched paths 15 is preferably 10 to 100 µm.

The cross-sectional shape of the core 12 perpendicular to the light guiding direction 17 is not particularly limited, but is preferably a trapezoid or a rectangle with excellent patterning properties. The height of the core 12 (thickness of the core 12) is preferably 30 to 100 µm.

The optical waveguide 10 with a light emitting device configured as above is excellent in light emitting feature of the light beams 33.

The core 12 is generally embedded in a cladding layer 18 and made of a material having a refractive index higher than that of the cladding layer 18. A core 12 is preferably made of a UV curable resin having excellent patterning properties. Preferred examples of such a UV curable resin include UV curable acrylic resins, UV curable epoxy resins, UV curable siloxane resins, UV curable norbornene resins, and UV curable polyimide resins or the like.

The cladding layer 18 is generally made of a material having a lower refractive index than the core 12. The material of the cladding layer 18 is not particularly limited, but preferable examples thereof include glass, silicone, metals or resins and the like. The cladding layer 18 may be constituted from a single layer or multiple layers. In the case of multiple layers, typically, the cladding layer 18 comprises: an under-cladding layer; and an over-cladding layer. The cladding layer 18 preferably has a thickness t of 5 to 20 µm.

The maximum refractive index difference between the core 12 and the cladding layer 18 is preferably 0.01 or more, more preferably 0.02 to 0.2. The refractive index of a resin for forming the core 12 and the cladding layer 18 can be increased or decreased as appropriate according to the kind and the content of an organic group introduced into the resin. For instance, the refractive index can be increased by the introduction of a cyclic aromatic group (e.g., a phenyl group) into a resin molecule or by increasing a cyclic aromatic group content per resin molecule. On the other hand, the refractive index can be decreased by, for example, introducing a linear or an aliphatic group (e.g., a methyl group or a norbornene group) into a resin molecule or increasing a linear or aliphatic group content per resin molecule.

The optical waveguide 13 can be formed by any method, such as a dry etching method using plasma, a transfer method, an exposure and development method or a photobleaching method or the like.

[Coordinate Input Region]

In this specification, the word "coordinate input region 32" refers to a region where the light beams 33 generated from the light-emitting sided-optical waveguide 31 travel in the optical touch panel 30 of the present invention. The optical touch panel 30 of the present invention provides a coordinate input with a finger or a pen by blocking part of the light beams 33 crossing the coordinate input region 32.

The coordinate input region 32 is typically a liquid crystal display panel or a display screen of a plasma display panel. An open space may be provided in front of the coordinate input region 32. Alternatively, a glass panel or an acrylic plate may be provided on the surface of the coordinate input region 32 to improve scratch resistance. The surface of the glass panel or the acrylic plate may be anti-reflection (AR) treated or anti-glare (AG) treated.

[Light-Receiving Sided-Optical Waveguide]

Figure 4:
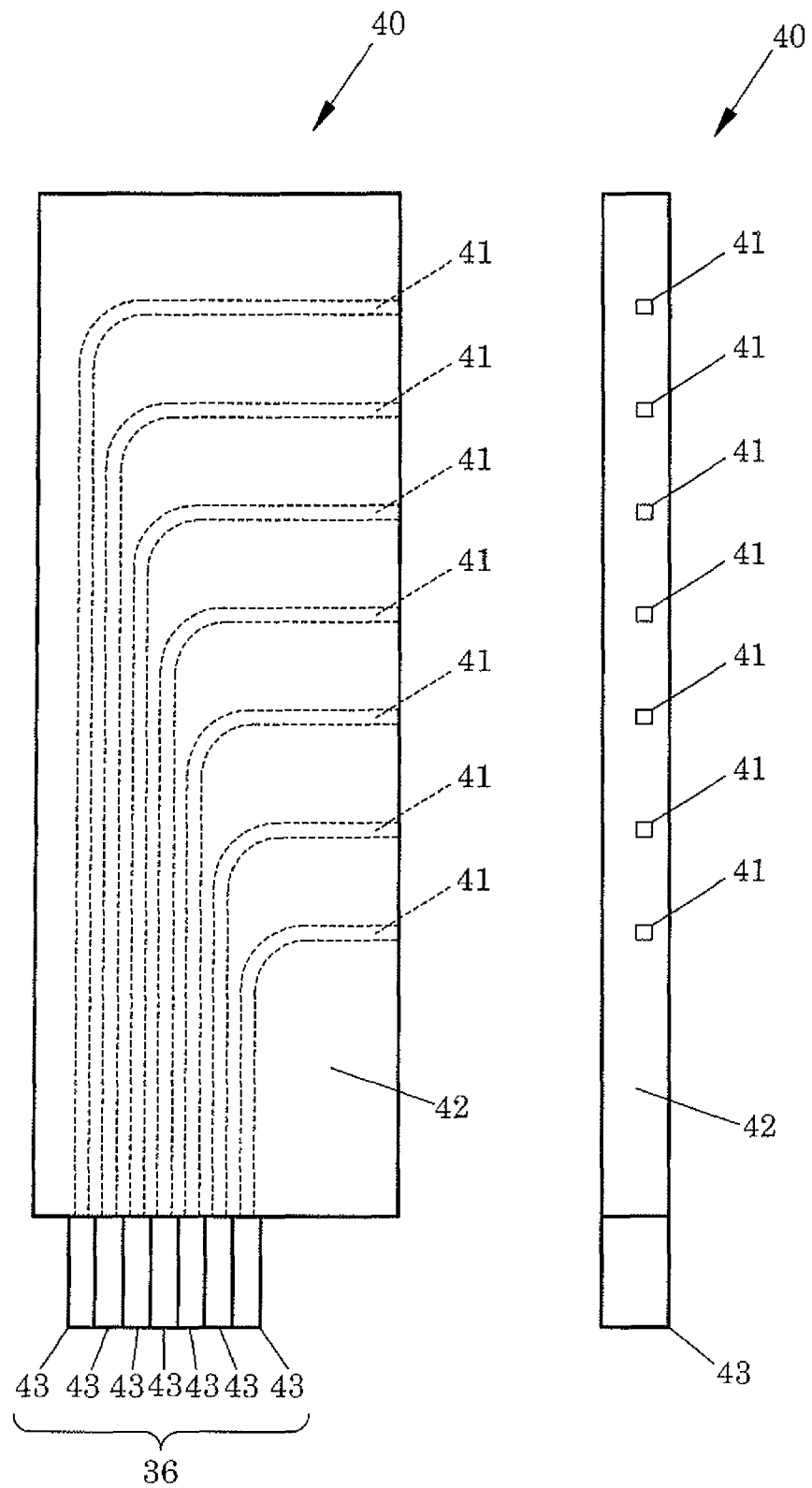
FIG. 4 is a schematic view of a light-receiving sided-optical waveguide.

FIG. 4 shows one example of a light-receiving sided-optical waveguide 40 to be used in the present invention. The light-receiving sided-optical waveguide 40 to be used in the present invention is not particularly limited, as long as the optical waveguide 40 receives the light beams 33 having crossed the coordinate input region 32. As shown in FIG. 4, the light-receiving sided-optical waveguide 40 preferably comprises: a plurality of cores 41; and a cladding layer 42 wherein the cores 41 are embedded. In the light-receiving sided-optical waveguide 40, one end of the respective cores 41 is provided toward the coordinate input region 32 and the other end of the respective cores 41 is optically coupled to the plurality of light receiving devices 43.

In principle, the resolution of the optical touch panel 30 using optical waveguides is determined according to the number and pitch of the cores 41 of the light-receiving sided-optical waveguide 40 optically coupled (optical coupling) to the light receiving devices 43. Thus, a plurality of cores 41 for optically coupled to the light receiving devices 43 are needed.

However, in the light-emitting sided-optical waveguide 13, the number of the core 12 to be needed may be one in the end 14c optically coupled to the light receiving device 11, as far as parallel light can be emitted to the coordinate input region 32.

[Light Receiving Device]

The light receiving device 43 to be used in the present invention converts an optical signal into an electrical signal to detect the intensity of the light beams 33 received at the light-receiving sided-optical waveguide 40. The light beams 33 detected from the light receiving device 43 preferably has a wavelength in a near-infrared area (700 to 2,500 nm).

The structure of light receiving device groups 36 that are aggregates of the plurality of light receiving devices 43 is preferably a one-dimensional image sensor wherein light receiving portions (e.g., photo diodes) are aligned. Examples of such light receiving device groups 36 include a Complementary Metal-oxide Semiconductor (CMOS) image sensor and a Charge Coupled Device (CCD) image sensor or the like.

[Applications]

The applications of the optical touch panel 30 of the present invention are not particularly limited, but are used for personal computers, bank ATM systems, portable game devices, tablet personal computers, office automation equipment, and factory automation equipment or the like.

EXAMPLE

Example

Preparation of Varnish for Forming a Cladding Layer

A varnish for forming a cladding layer was prepared by mixing 100 parts by weight of a UV-curable epoxy-based resin having an alicyclic skeleton (EP 4080E manufactured by ADEKA CORPORATION) (Component A) and 2 parts by weight of a photo-acid-generation agent (CPI-200K manufactured by SAN-APRO Ltd.) (Component B).

[Preparation of Varnish for Forming Cores]

A varnish for forming cores was prepared by mixing 40 parts by weight of a UV-curable epoxy-based resin having a fluorene skeleton (OGSOL EG manufactured by Osaka Gas Chemicals Co., Ltd.) (Component C), 30 parts by weight of a UV-curable epoxy-based resin having a fluorene skeleton (EX-1040 manufactured by Nagase ChemteX Corporation) (Component D), 30 parts by weight of 1,3,3-tris(4-(2-(3-oxetanyl))butoxyphenyl)butane (synthesized in accordance with Example 2 in JP 2007-070320 A) (Component E), 1 part by weight of the Component B, and 41 parts by weight of ethyl lactate.

[Formation of Optical Waveguide with Light Emitting Device]

Figure 5:
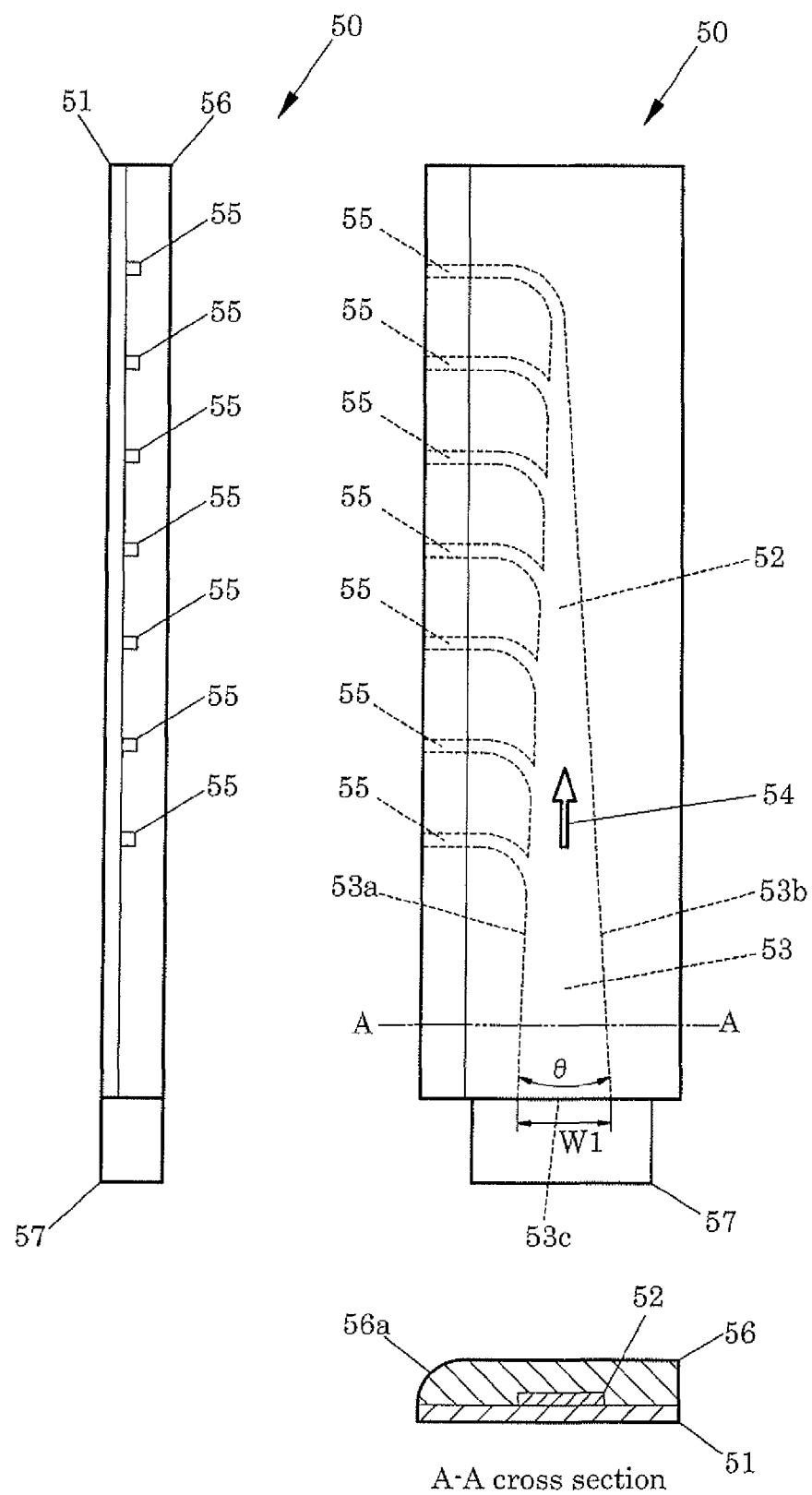
FIG. 5 is a schematic view of an optical waveguide with a light emitting device in an embodiment.

The varnish for forming the aforementioned cladding layer was applied onto the surface of a polyethylene naphthalate (PEN) film having a thickness of 188 µm, irradiated with UV light at 1,000 mJ/cm², and thermally-treated at 80° C. for 5 minutes to form an under-cladding layer 51 having a thickness of 20 µm as shown in FIG. 5. The refractive index of the under-cladding layer 51 as measured at a wavelength of 830 nm was 1.510.

Then, the varnish for forming cores was applied onto the surface of the under-cladding layer 51 and thermally-treated at 100° C. for 5 minutes to form a core layer. The core layer was then covered with a photo mask (gap: 100 µm), irradiated with UV light at 2,500 mJ/cm², and thermally-treated at 100° C. for 10 minutes.

An unexposed portion of the core layer was dissolved away using an aqueous γ-butyrolactone solution and thermally treating the core layer at 120° C. for 5 minutes to form the patterns of a plurality of cores 52. The cores 52 respectively comprise: a main path 53 (maximum width W1=2,030 µm; height: 50 µm); and 70 pieces of branched paths 55 (width: 55 µm, height: 50 µm) sequentially branched in a light guiding direction 54 of the main path 53. The refractive index of each of the cores as measured at a wavelength of 830 nm was 1.592.

Next, a concave-shaped molding die (made of quartz) was placed so as to cover the entire cores 52 to fill the varnish for forming a cladding layer inside the concave-shaped molding die. The concave-shaped molding die was irradiated with UV light at 2,000 mJ/cm² from the surface of the concave-shaped molding die to perform thermal treatment at 80° C. for 5 minutes. Subsequently, the concave-shaped molding die was released to form an over-cladding layer 56 with a convex lens having a side sectional shape of a substantially quarter of a circle at its distal end 56a as shown in FIG. 5. The over-cladding layer 56 had a thickness of 1 mm and its refractive index as measured at a wavelength of 830 nm was 1.510. The convex lens had a radius of curvature of 1.5 mm.

A light emitting devices 57 (VCSEL manufactured by Optowell Co., Ltd.) for emitting light having a wavelength of 850 nm was coupled to an end 53c of the main path 53 in each of the cores 52 via a UV curable resin to produce an optical waveguide 50 with a light emitting device.

As shown in FIG. 5, the core 52 included in the optical waveguide 50 with a light emitting device comprises: the main path 53; and the plurality of branched paths 55 branched from the main path 53. The main path 53 is formed so that the width W1 thereof becomes narrower as the main path 53 moves away from the end 53c coupled to the light emitting device 57. The angle θ formed by one side 53a extending in the light guiding direction 54 of the main path 53 and the other side 53b oppositely faced to the one side 53a is 0.8°.

[Method for Producing Light-Receiving Sided-Optical Waveguide]

The light-receiving sided-optical waveguide 40 was produced in the same manner as in the optical waveguide 50 with a light emitting device except for changing the photo mask to shape the cores 41 as shown in FIG. 4 (branched paths are not formed). The light-receiving sided-optical waveguide 40 comprises: 70 pieces of cores 41; and a cladding layer 42 wherein the cores are embedded.

[Method for Producing Optical Touch Panel]

The thus produced two optical waveguides 50 with a light emitting device and two light-receiving sided-optical waveguides 40 were respectively prepared. The ends of the cores 41 of each of the two light-receiving sided-optical waveguides 40 were coupled via a UV curable resin to a plurality of light emitting devices 43 (CMOS linear sensor array manufactured by TAOS Inc.). As shown in FIG. 3, these optical waveguides were arranged so as to surround the coordinate input region 32 with a 10.4-inch opposing corner to produce the optical touch panel 30. The optical touch panel 30 was capable of detecting the coordinates position by blocking light beams crossing the coordinate input region 32 with a finger.

Comparative Example

Figure 6:
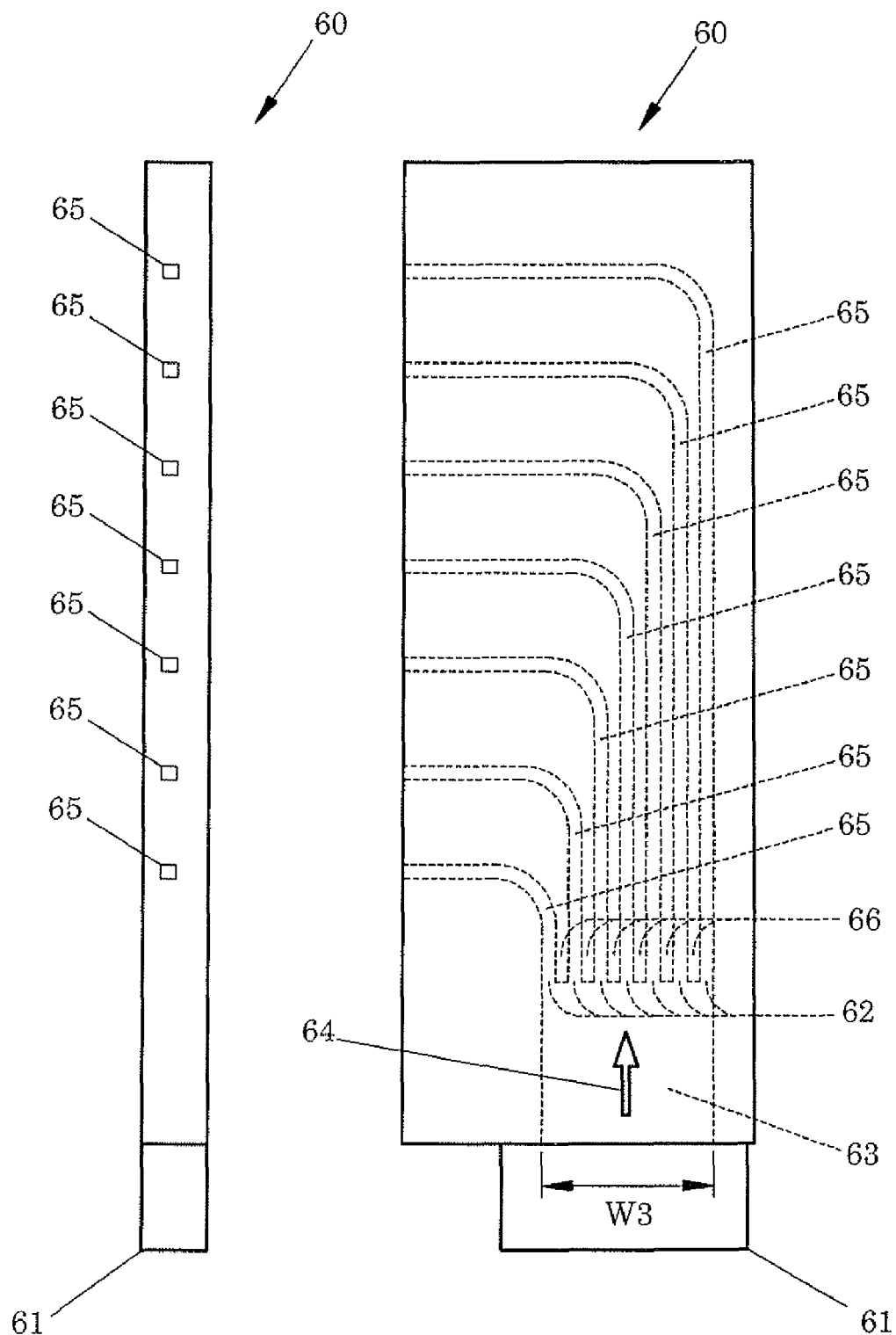
FIG. 6 is a schematic view of a conventional optical waveguide with a light emitting device.

As shown in FIG. 6, cores respectively including a main path 63 (total width: W3=4,885 µm, height: 50 µm), 70 pieces of branched paths 65 (width: 55 µm, height: 50 µm, spaces 66=15 µm×69 pieces) were formed. An optical waveguide 60 with a light emitting device was produced in the same manner as in the Example except for the above. The optical touch panel 30 was produced in the same manner as in the Example except for using the optical waveguide 60 with a light emitting device.

[Evaluation]

Table 1 shows the maximum core widths W1 and W3 of an optical waveguide with a light emitting device in the Example and Comparative Example and a mean value of light intensity (relative intensity) detected by the light receiving device groups 36 of the optical touch panel 30 using the aforementioned optical waveguides.

TABLE 1

|  | Maximum width of cores (main paths) | Light intensity (mean value) detected at a light receiving device. There is no unit for the light intensity because of relative intensity. |
| --- | --- | --- |
| Example | 2,030 µm | 1.86 |
| Comparative Example | 4,885 µm | 0.19 |

Measurement Methods

[Refractive Index]

The varnish for forming a cladding layer and the varnish for forming cores were respectively applied onto silicon wafers by spin coating to form films thereon so that refractive-index measuring samples were prepared, and these were measured by using a prism coupler (manufactured by Sairon Technology, Inc.).

[Width and Height of Core]

An optical waveguide was cut crosswise using a dicing saw (DAD522 manufactured by DISCO Corporation), and the cutting surface of the optical waveguide was observed using a laser microscope (manufactured by Keyence Corporation) to measure the width and height of each core.

This application claims priority from Japanese Patent Application No. 2009-013044, which is incorporated herein by reference.

There have thus been shown and described a novel optical waveguide with light emitting device and a novel optical touch panel which fulfill all the objects and advantages sought therefor. Many changes, modifications, variations and other uses and applications of the subject invention will, however, become apparent to those skilled in the art after considering this specification and the accompanying drawings which disclose the preferred embodiments thereof. All such changes, modifications, variations and other uses and applications which do not depart from the spirit and scope of the invention are deemed to be covered by the invention, which is to be limited only by the claims which follow.

What is claimed is:

1. An optical waveguide with a light emitting device comprising:
   a light emitting device; and
   an optical waveguide including a core for guiding light emitted from the light emitting device to generate light beams,
   wherein the core is embedded in a cladding layer and the core has a refractive index higher than the cladding layer,
   the cladding layer comprises: an under-cladding layer; and an over-cladding layer, and the core is formed on the under-cladding layer and embedded by the over-cladding layer,
   the core comprises: a main path; and a plurality of branched paths branched at branched points from the main path,
   an end of the main path-side on the core is optically coupled to the light emitting device,
   the branched points are sequentially provided in a guiding light direction,
   the width of the main path becomes narrower as the main path moves away from the light emitting device, and an angle θ formed by one side extending in the light guiding direction and the other side opposed to the one side is 0.1° to 5°, and
   the light emitting device is a light-emitting diode or a semiconductor laser.

2. The optical waveguide according to claim 1, wherein the maximum refractive index difference between the core and the cladding layer is 0.02 to 0.2.

3. The optical waveguide according to claim 2, wherein the cladding layer has a convex lens formed into virtually a ¼ arc shape in the cross section at a tip section where light beams are emitted.

4. An optical touch panel comprising:
   a coordinate input region;
   an optical waveguide with a light emitting device for generating light beams crossing the coordinate input region;
   a light-receiving sided-optical waveguide for receiving the light beams having crossed the coordinate input region; and
   light emitting device groups for detecting the intensity of light received at the light-receiving sided-optical waveguide,
   wherein the optical waveguide with a light emitting device is the optical waveguide with a light emitting device according to claim 1.

5. The optical waveguide according to claim 1, wherein the plurality of branched paths respectively have a maximum width of 10 μm to 100 μm.

* * * * *